(12) United States Patent
Gengo et al.

(10) Patent No.: US 6,203,479 B1
(45) Date of Patent: Mar. 20, 2001

(54) AUTOMATIC TOOL CHANGING DEVICE FOR MACHINE TOOLS

(75) Inventors: Ohira Gengo; Ki Tai Kim; Chang Yong Kim, all of Kwangju (KR)

(73) Assignee: Hwacheon Machine Tool Co., Ltd., Kwangju (KR)

( * ) Notice: Subject to any disclaimer, the term of this patent is extended or adjusted under 35 U.S.C. 154(b) by 0 days.

(21) Appl. No.: 09/369,834

(22) Filed: Aug. 9, 1999

(30) Foreign Application Priority Data

Aug. 14, 1998 (KR) .................................................. 98-33153

(51) Int. Cl.[7] .................................................. B23Q 3/157
(52) U.S. Cl. .................................. 483/62; 483/3; 483/39; 483/67
(58) Field of Search ............................... 483/2, 3, 12, 13, 483/59, 60, 61, 62, 67, 36, 39, 38, 40

(56) References Cited

U.S. PATENT DOCUMENTS

| | | | |
|---|---|---|---|
| 4,119,213 | * 10/1978 | Sato et al. | 483/67 |
| 4,335,500 | * 6/1982 | Munekata et al. | 483/62 X |
| 5,322,494 | * 6/1994 | Holtey et al. | 483/12 |
| 5,649,887 | * 7/1997 | Taki et al. | 483/3 |

FOREIGN PATENT DOCUMENTS

| | | | |
|---|---|---|---|
| 165950 | * 10/1983 | (JP) | 483/3 |
| 123240 | * 7/1985 | (JP) | 483/62 |
| 48438 | * 3/1987 | (JP) | 483/67 |
| 5-33242 | * 8/1993 | (JP) | 483/3 |

* cited by examiner

*Primary Examiner*—William Briggs
(74) *Attorney, Agent, or Firm*—Jacobson, Price, Holman & Stern, PLLC

(57) ABSTRACT

An automatic tool changing device (ATC) for machining tools is disclosed. The ATC consists of arbor rotation guide means, arbor position changing means, arbor rotation means, tool changing means and ATC protection means. The ATC is positioned at a side of the movable table and effectively changes tools within the inner diameter circle of a rotary housing, thus shortening the arbor movement stroke and conserving the tool changing time during a tool changing operation. The ATC is also protected from the spindle stock of a machining tool, thus being free from any damage caused by chips from the spindle stock. The ATC is positioned at a side of the movable table in place of the column different from a typical ATC, so that it remarkably reduces the volume of the ATC protection cover and saves the manufacturing cost of such machining centers.

13 Claims, 12 Drawing Sheets

AUTOMATIC TOOL CHANGING DEVICE FOR MACHINE TOOLS

BACKGROUND OF THE INVENTION

1. Field of the Invention

The present invention relates, in general, to an automatic tool changing device for NC machine tools and, more particularly, to an automatic tool changing device for machining centers, the device being positioned at a side of the movable table of a machining center and effectively changing tools within the inner diameter circle of a rotary housing, thus shortening the arbor movement stroke and saving tool changing time during a tool changing operation, the device being also effectively protected from the machining part or the spindle stock of such a machining center, thus being almost completely free from any damage caused by chips from the machining part.

2. Description of the Prior Art

As well known to those skilled in the art, machining centers are NC (numerical control) machine tools for shaping, cutting, milling, turning, boring, drilling, grinding, or polishing of solid parts, especially metals, under computer numerical control by making use of several axes and a variety of tools and operations. The construction of a typical machining center is shown in FIG. 7.

As shown in the drawing, the typical machining center comprises a bed 11, with a table 111 being carried on the bed 11 to be horizontally movable along an X-axis of the bed 11. A column 12 is positioned in back of the bed 11 to be vertically movable along a Y-axis of the bed 11. A spindle stock 13 is positioned in front of the bed 11 to be horizontally movable along a Z-axis of the bed 11, with a tool carrying arbor 100 being fixed to the stock 13. An automatic tool changing device (ATC) 9 is set on a side of the column 12 and is used for automatically changing tools for the spindle stock 13.

The construction of such a typical ATC is shown in FIGS. 8a and 8b in detail.

As shown in the drawings, the typical ATC 9 comprises a rotary tool carrier 91. The rotary tool carrier 91, set on a side of the column 12, is designed for being rotatable around its center shaft 911. An arbor position changer 92 is positioned under the rotary tool carrier 91 and is used for changing the position of a tool carrying arbor 100 from its horizontal position to its vertical position. A tool changer 93 is positioned at a side of the arbor position changer 92 and is used for moving the arbor 100 to the spindle stock 13 prior to changing an existing tool of the stock 13 with a new tool or the tool of the above arbor 100.

When it is necessary to change an existing tool of the stock 13 with a new tool using the above ATC 9, the tool carrier 91 is rotated around its center shaft 911 so as to allow the ATC to select a desired arbor 100 from a plurality of arbors 100 provided on the carrier 91. Of course, the arbors 100 individually carry a tool, so that the number of arbors 100 is determined by the number of tools for the machining center. The selected arbor 100 is, thereafter, horizontally laid on the center under the tool carrier 91 prior to being positioned vertically by the arbor position changer 92. The ATC 9 moves the vertically positioned arbor 100 to the spindle stock 13 by the tool changer 93 prior to changing the existing tool with the tool of the selected arbor 100.

However, such an ATC 9 is problematic in that it performs an automatic tool changing operation at the outer diameter circle of the rotary tool carrier 91, thus rendering the arbors 100 to move in a long stroke during a tool changing operation. This results in consumption of time during such a tool changing operation.

Another problem experienced in the typical ATC 9 resides in that it is positioned above the machining part of the machining center at a side of the column 12. The ATC 9 may be thus easily damaged or broken by the chips from the machining part.

In the prior art, the ATC 9, which is set on the column 12 to project outwardly, is covered and protected by an ATC casing. However, in order to effectively protect the ATC 9, the ATC cover has to be designed for having a large volume and this increases the manufacturing cost of such machining centers.

SUMMARY OF THE INVENTION

Accordingly, the present invention has been made keeping in mind the above problems occurring in the prior art, and an object of the present invention is to provide an ATC for machining centers, which is positioned at a side of the movable table of a machining center and effectively changes tools within the inner diameter circle of a rotary housing, thus shortening the arbor movement stroke and conserving tool changing time during a tool changing operation.

Another object of the present invention is to provide an ATC for machining centers, which is also effectively protected from the machining part or the spindle stock of a machining center, thus being almost completely free from any damage caused by chips from the machining part.

A further object of the present invention is to provide an ATC for machining centers, which is positioned at a side of the movable table in place of the column different from a typical ATC, thus remarkably reducing the volume of the ATC protection cover and saving the manufacturing cost of such machining centers.

In order to accomplish the above object, the present invention provides an automatic tool changing device for machining tools, the machining tools individually comprising a bed movably carrying a table to allow the table to be movable along an X-axis of the bed, a column positioned at a side of the bed to be movable along a Y-axis of the bed, and a spindle stock positioned in front of the column to be movable along a Z-axis of the bed with a tool carrying arbor being held to the spindle stock, comprising: arbor rotation guide means provided on the bed at a position around the table and adapted for guiding a rotating action of a plurality of tool carrying arbors; arbor position changing means positioned above the arbor rotation guide means and adapted for selectively changing a position of a selected one of the arbors from its horizontal position to its vertical position; arbor rotation means installed inside the arbor rotation guide means and adapted for rotating the arbors; and tool changing means positioned between the arbor rotation means and the spindle stock and adapted for changing an existing arbor of the spindle stock with the selected arbor.

BRIEF DESCRIPTION OF THE DRAWINGS

The above and other objects, features and other advantages of the present invention will be more clearly understood from the following detailed description taken in conjunction with the accompanying drawings, in which:

FIGS. 1a and 1b are views showing the position of an ATC of this invention set on a machining center, in which:

FIG. 1a is a front view of the machining center; and

FIG. 1b is a side view of the machining center;

FIGS. 2a and 2b are views showing the construction of the ATC of this invention, in which:

FIG. 2a is a side view of the ATC; and

FIG. 2b is a sectional view of the ATC taken along the line A—A of FIG. 2a;

FIGS. 6a and 6b are views of a tool changing means included in the ATC of this invention, in which:

FIG. 6a is a front view of the tool changing means; and

FIG. 6b is a sectional view of the tool changing means taken along the line B—B of FIG. 6a;

FIGS. 8a and 8b are views showing the construction of such a typical ATC, in which:

FIG. 8a is a side view of the typical ATC; and

FIG. 8b is a sectional view of the typical ATC taken along the line C—C of FIG. 8a.

DESCRIPTION OF THE PREFERRED EMBODIMENTS

Figure 1A:
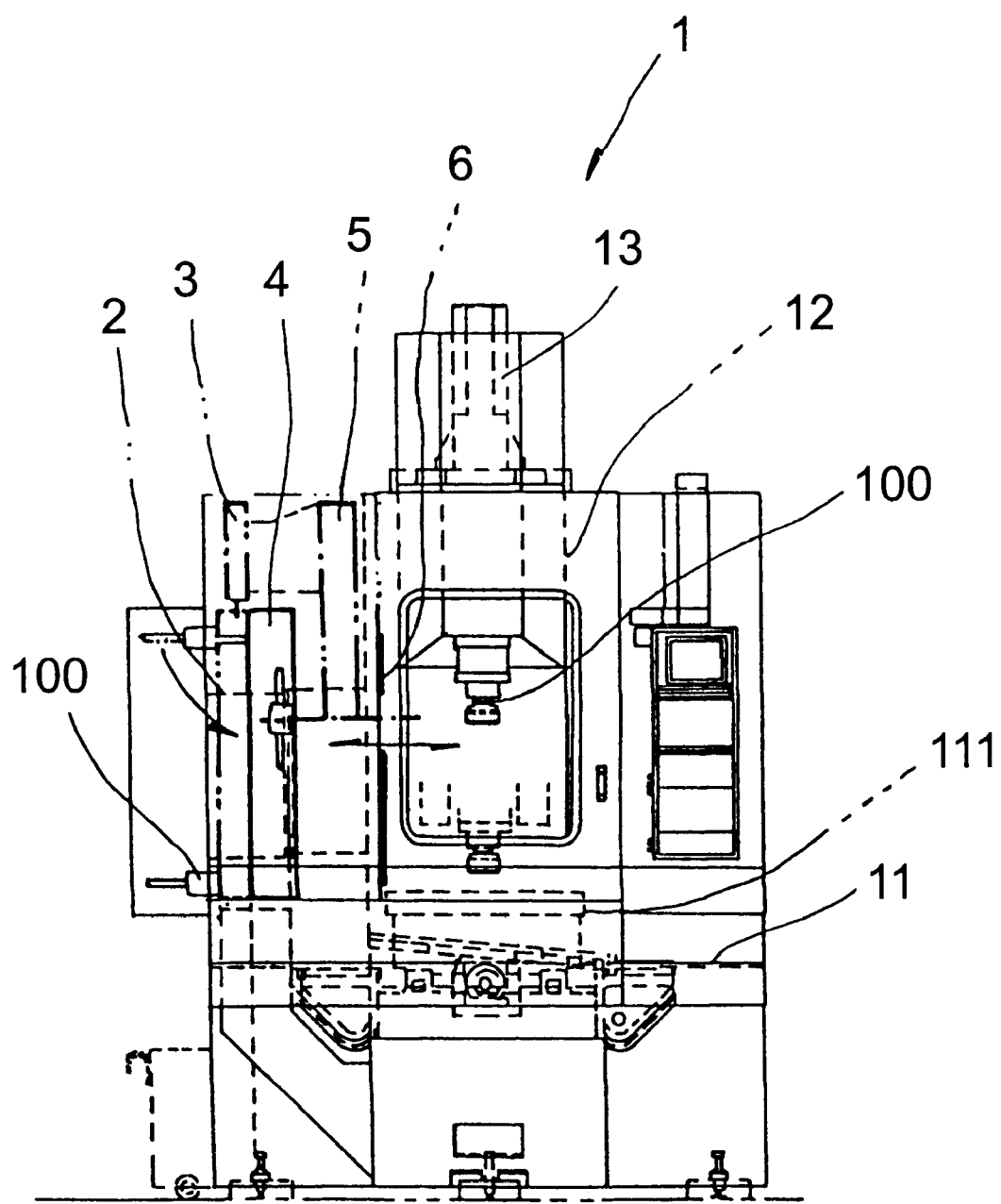
Figure 1B:
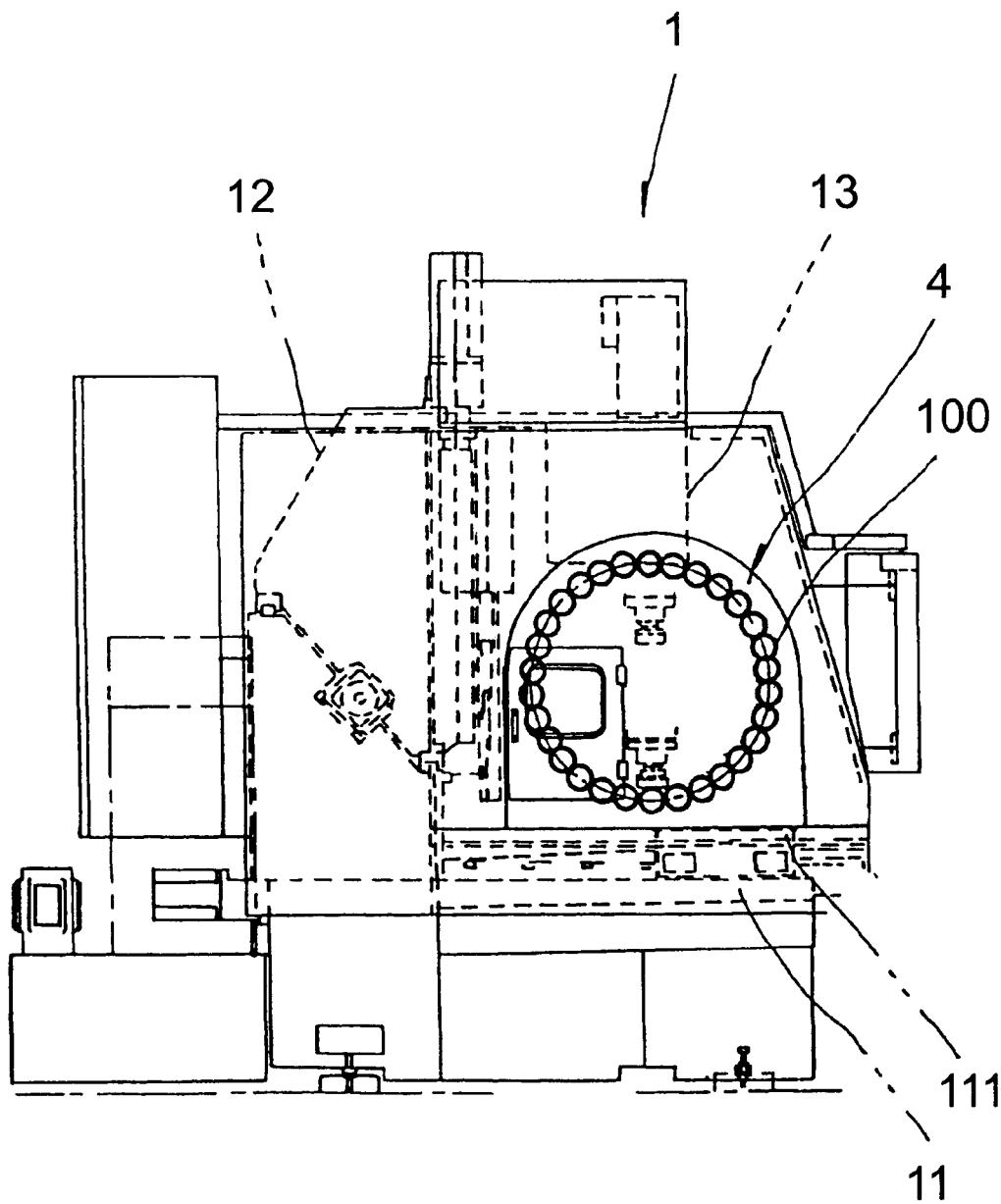

FIGS. 1a and 1b show the position of an ATC of this invention set on a machining center.

As shown in the drawings, the machining center 1 comprises a bed 11, with a table 111 being carried on the bed 11 to be horizontally movable along an X-axis of the bed 11. A column 12 is positioned in back of the bed 11 to be vertically movable along a Y-axis of the bed 11. A spindle stock 13 is positioned in front of the bed 11 to be horizontally movable along a Z-axis of the bed 11, with a tool carrying arbor 100 being fixed to the stock 13. The above construction of the machining center remains the same as that described for the prior art.

However, the ATC of this invention has the following position and construction different from that of the typical ATC. That is, the ATC of this invention comprises a plurality of means: an arbor rotation guide means 2, an arbor position changing means 3, an arbor rotation means 4, a tool changing means 5 and an ATC protection means 6 as shown in FIGS. 2a and 2b.

The arbor rotation guide means 2 of the ATC is fixed to the bed 11 at a position around the table 111 of the machining center and is used for guiding the rotating action of arbors 100. The arbor position changing means 3 is positioned above the arbor rotation guide means 2 and is used for selectively changing the position of an arbor 100 from a horizontal position to a vertical position. The arbor rotation means 4 is installed inside the arbor rotation guide means 2 and is used for rotating the arbors 100. The tool changing means 5 is positioned between the arbor rotation means 4 and the spindle stock 13 and is used for changing the tool carrying arbors 100 for the spindle stock 13. In such a case, the arbors 100 are regularly positioned along the inner diameter circle of a rotary housing 41 of the arbor rotation means 4, so that the tool changing operation is performed within the inner diameter circle of the rotary housing 41. The ATC protection means 6 is positioned between the spindle stock 13 and the tool changing means 5, thus protecting the ATC from the spindle stock 13.

Figure 2A:
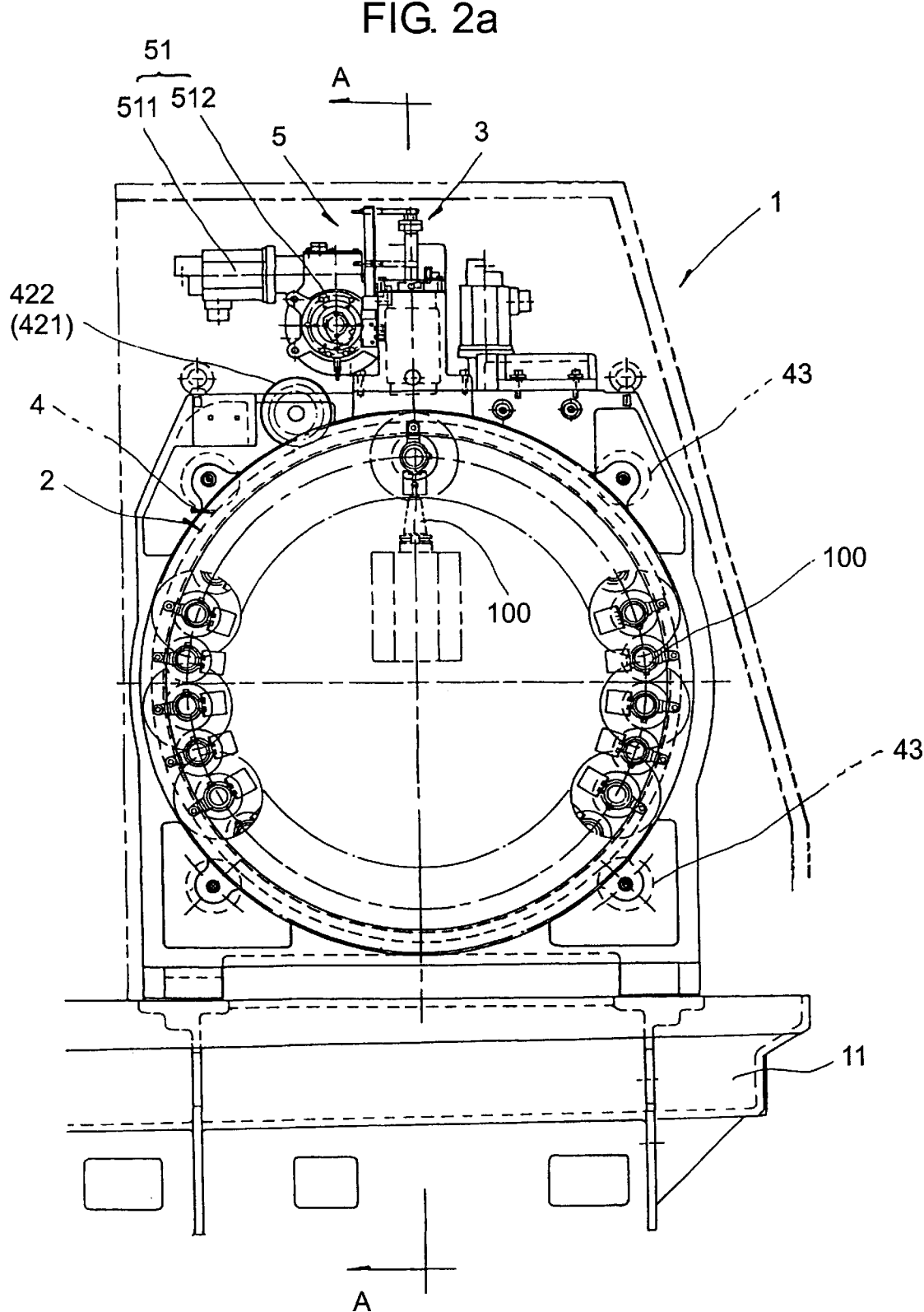
Figure 2B:
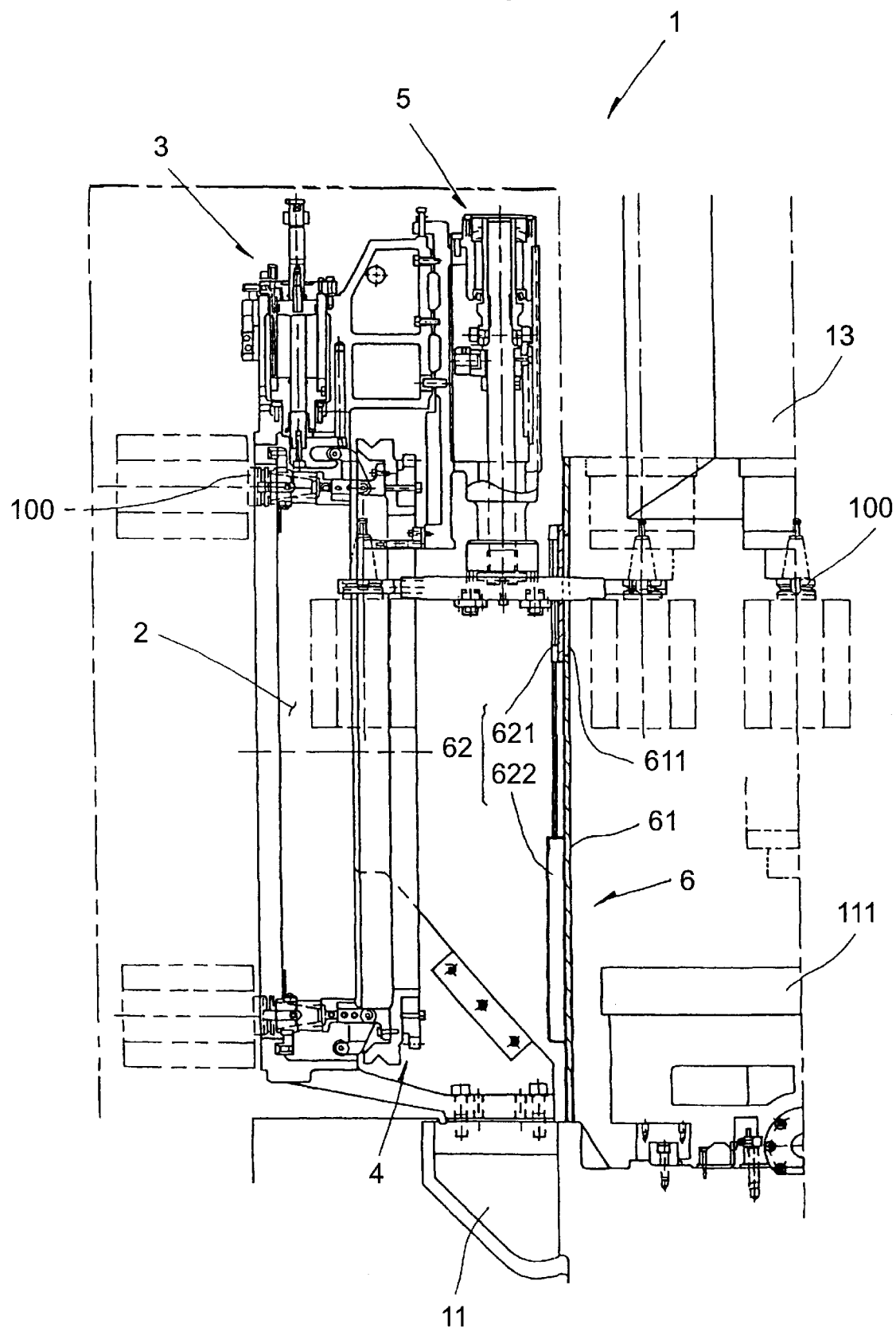
Figure 3:
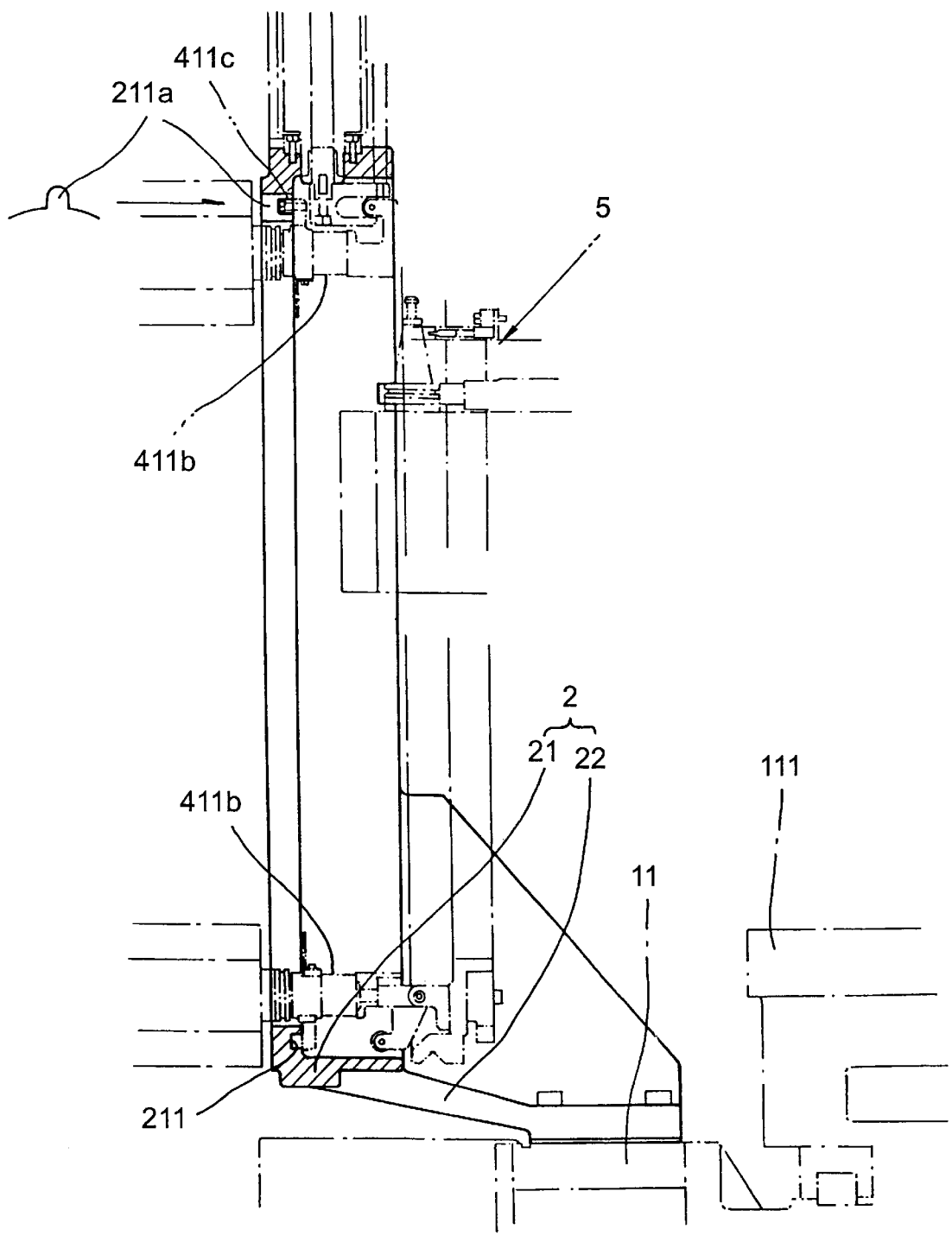
FIG. 3 is a front sectional view of an arbor rotation guide means included in the ATC of this invention.

The arbor rotation guide means 2 is shown in FIGS. 2a, 2b and 3. As shown in the drawings, the arbor rotation guide means 2, fixed to the bed 11 at a position around the table 111 of the machining center, comprises a cylindrical housing 21 and a bracket 22. The cylindrical housing 21 is provided with an annular guide groove 211 on its inner diameter wall at a lower portion for guiding the rotating action of a plurality of arbor holders 411b. The bracket 22 connects the bottom of the cylindrical housing 21 to the bed 11.

An opening 211a is formed on the housing 21 at a top position opposite to the guide groove 211. When an arbor 100 is shifted from its horizontal position to its vertical position, the opening 211a allows the roller 411c of an arbor holder 411b to be rotatable to the front prior to being removed from the holder 411b.

Figure 4:
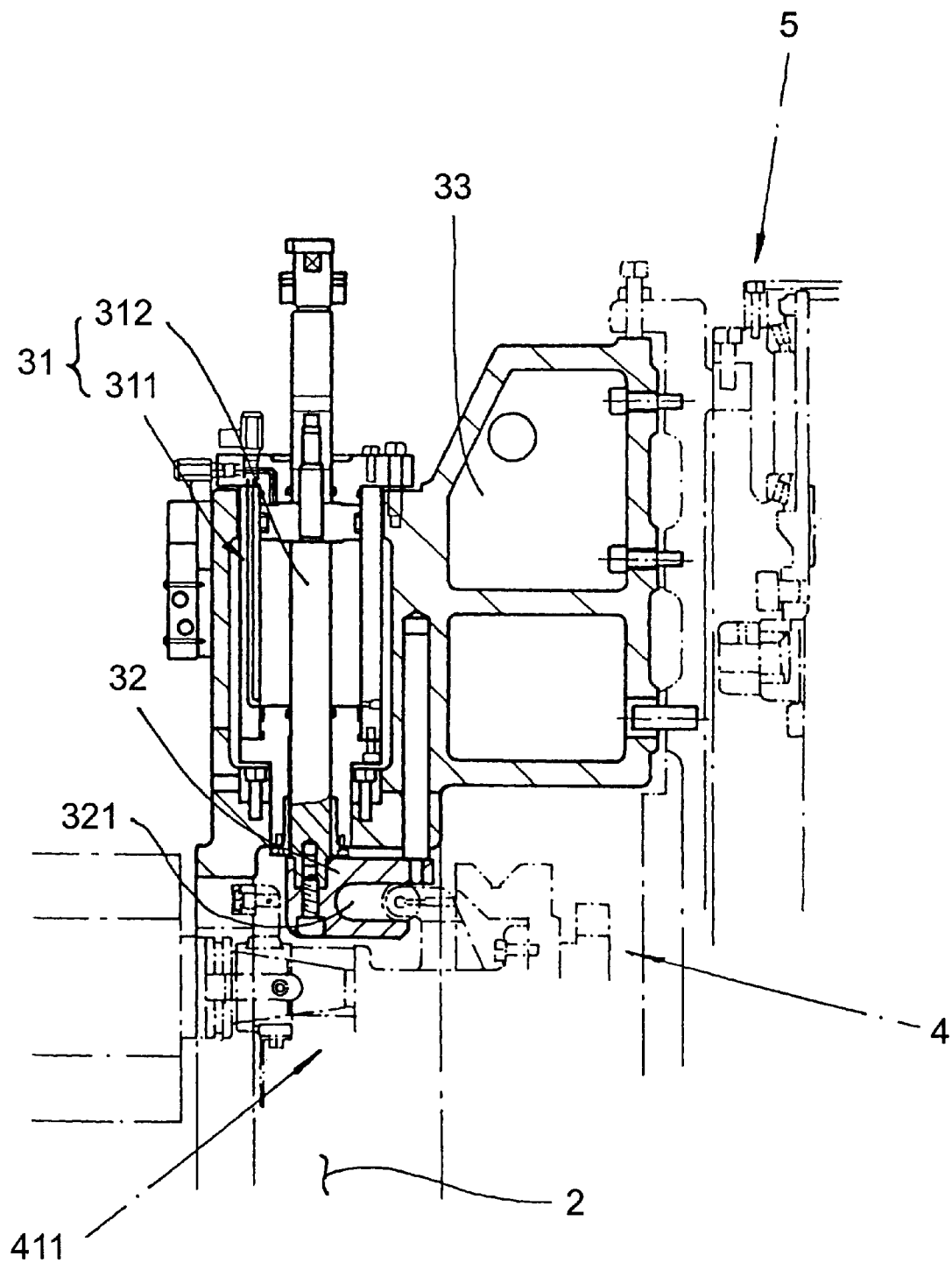
FIG. 4 is a front sectional view of an arbor position changing means included in the ATC of this invention.

The arbor position changing means 3, positioned above the arbor rotation guide means 2, comprises a drive unit 31, a lift 32 and a fixed bracket 33 as shown in FIGS. 2a, 2b and 4. The drive unit 31 is positioned at the center of the means 3, while the lift 32 ascends or descends by the drive unit 31. The fixed bracket 33 is positioned at a side of the drive unit 31 and holds the position of the tool changing means 5.

The drive unit 31 comprises an actuator 311, with the piston rod 312 of the actuator 311 being coupled to the lift 32 to actuate the lift 32.

A groove 321 is formed on the lift 32. The above groove 321 is connected to a plurality of arbor holder units 411 to shift the position of the arbors 100 between the horizontal and vertical positions.

Figure 5:
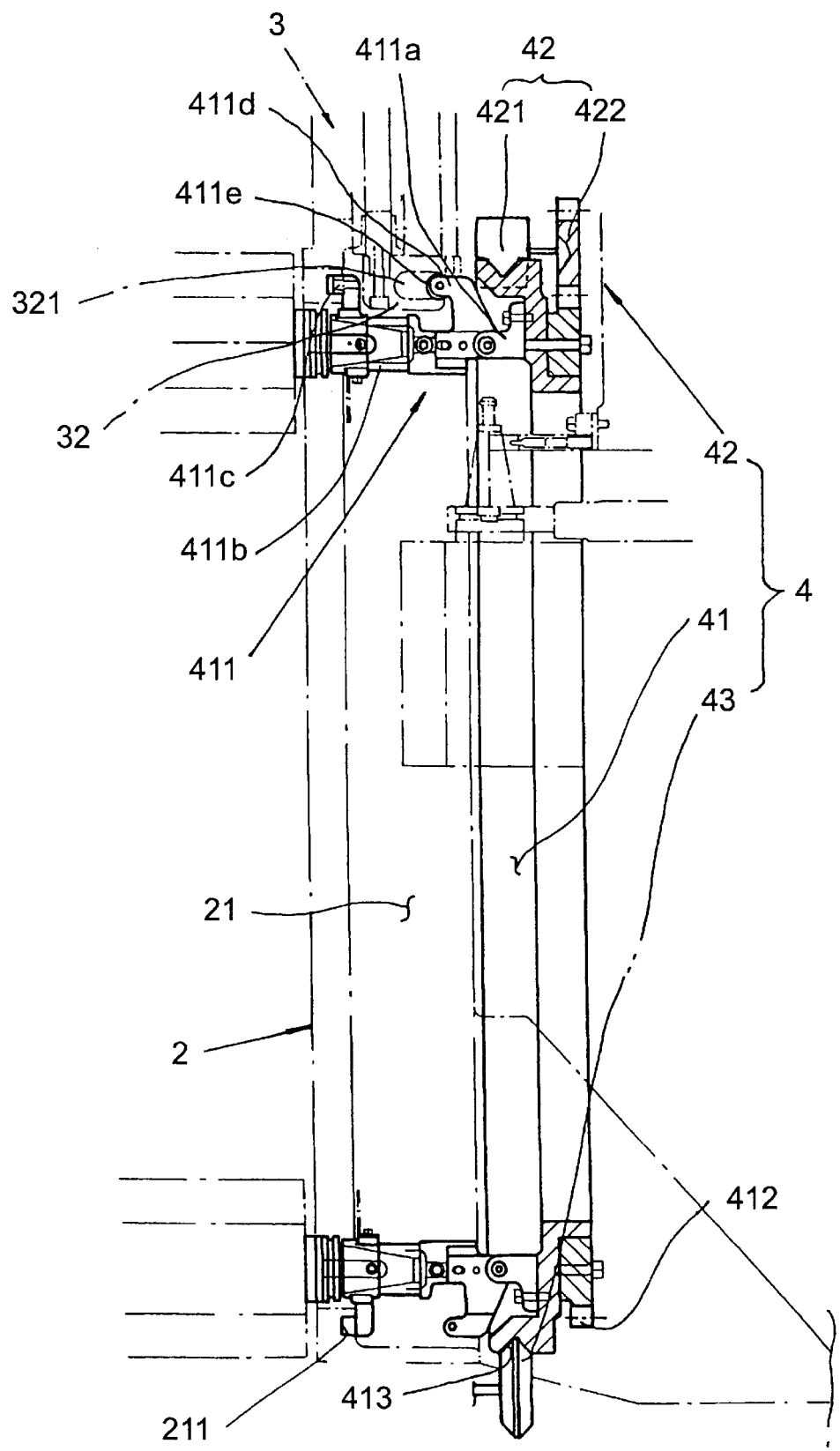
FIG. 5 is a front sectional view of an arbor rotation means included in the ATC of this invention.

The construction of the arbor rotation means 4 is shown in FIGS. 2a, 2b and 5. As shown in the drawings, the arbor rotation means 4, installed inside the cylindrical housing 21 of the arbor rotation guide means 2, comprises a rotary housing 41, a drive unit 42 and a plurality of guide rollers 43. The rotary housing 41 comprises a plurality of arbor holder units 411 which are regularly positioned on the inner diameter wall of said housing 41 and individually hold a tool carrying arbor 100. The tools of the arbors 100 are different from each other for shaping, cutting, milling, turning, boring, drilling, grinding, or polishing of solid parts, especially metals, under computer numerical control. A driven gear 412 is formed on the outside edge of the housing 41 and engages with the drive unit 42, thus selectively rotating the rotary housing 41 by the driving force of the drive unit 42. A guide groove 413 is formed on the outside edge of the housing 41 at a position around the driven gear 412 and engages with the guide rollers 43, thus guiding the rotation of the housing 41 while preventing the housing 41 from any eccentricity. The drive unit 42 comprises a drive motor 421 which is positioned at a side of the gear 412 of the rotary housing 41. A drive gear 422 engages with the output shaft of the drive motor 421 and also engages with the driven gear 412 of the rotary housing 41, thus selectively transmitting the rotating force of the motor 421 through the drive gear 412 to rotate the housing 41. The guide rollers 43 are installed on the rotary housing 41 at regular intervals and engage with the guide groove 413 of the housing 41, thus guiding the housing 41 in cooperation with the groove 413 while preventing the housing 41 from any eccentricity.

Each of the above arbor holder units 411, installed inside the rotary housing 41, comprises a fixed bracket 411a, an arbor holder 411b and a link 411d. The bracket 411a is fixed to the rotary housing 41. The arbor holder 411b is hinged to the front portion of the fixed bracket 411a and is used for holding an arbor 100. A roller 411c is provided at the top portion of the arbor holder 411b and rotatably engages with the annular guide groove 211 formed on the cylindrical housing 21 of the arbor rotation guide means 2. The link 411d is provided at the top portion of the arbor holder 411b and is connected to the lift 32 of the arbor position changing means 3, thus selectively changing the position of each arbor holder unit 411 between the horizontal and vertical positions.

A roller 411e is provided at the top portion of the link 411d and rotatably engages with the groove 321 of the lift 32.

Figure 6A:
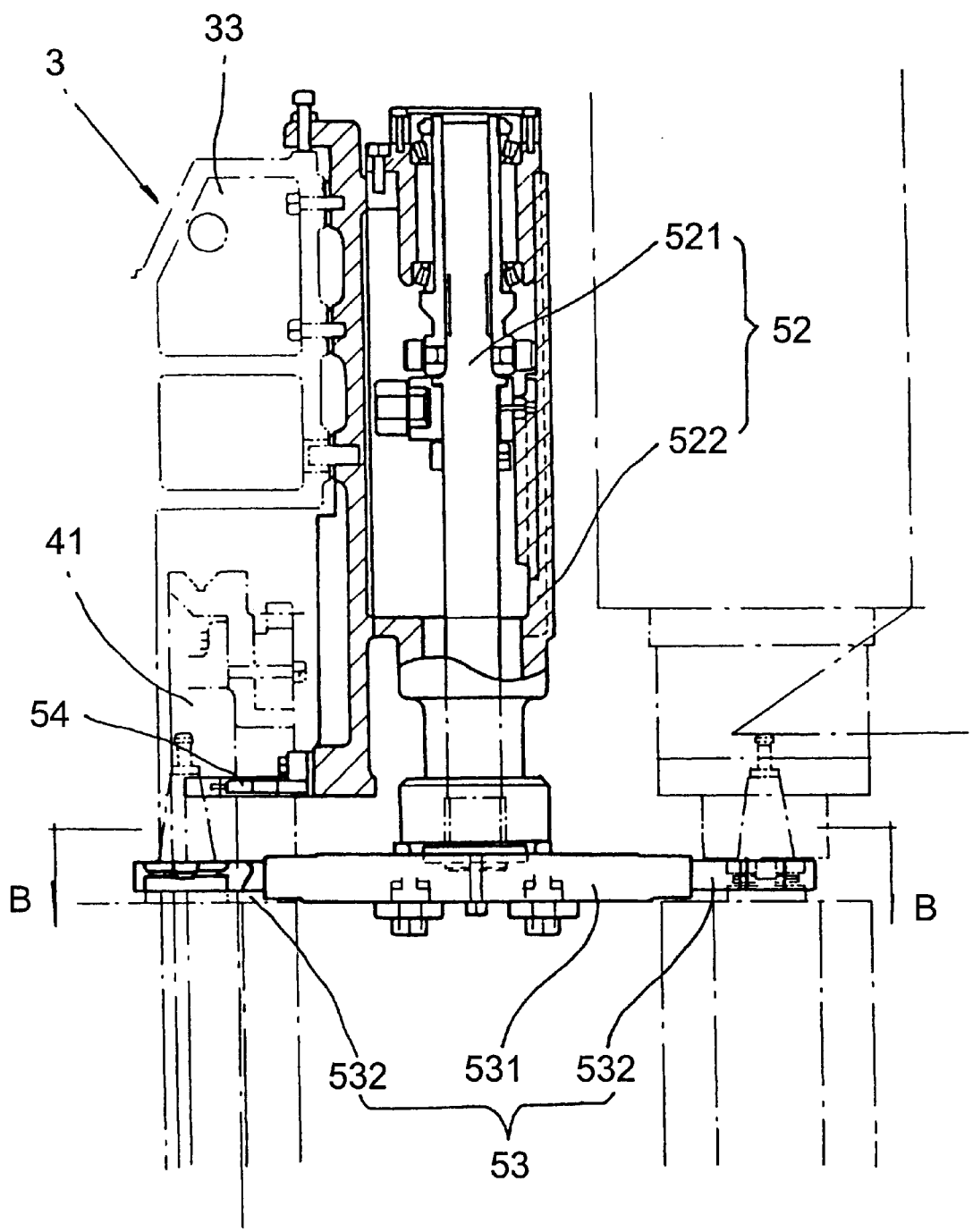
Figure 6B:
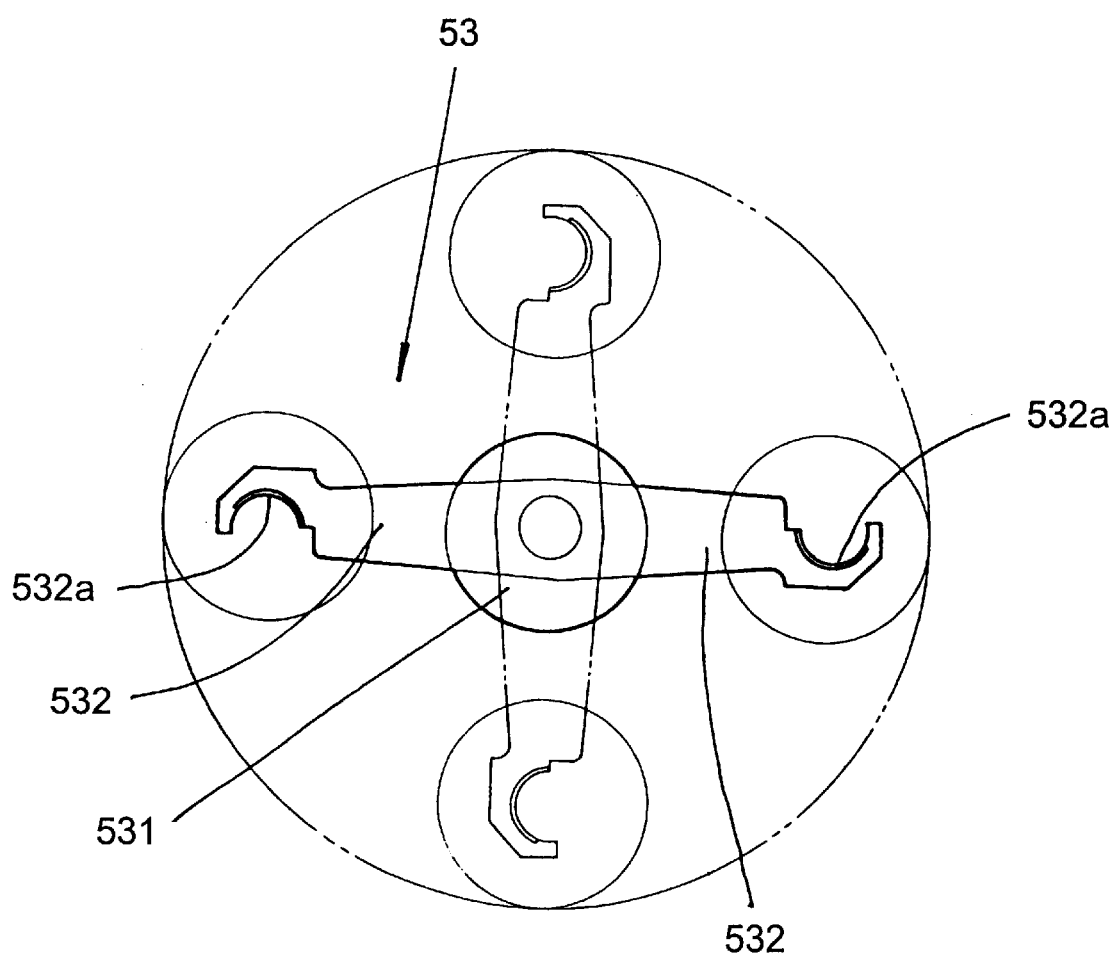
Figure 7:
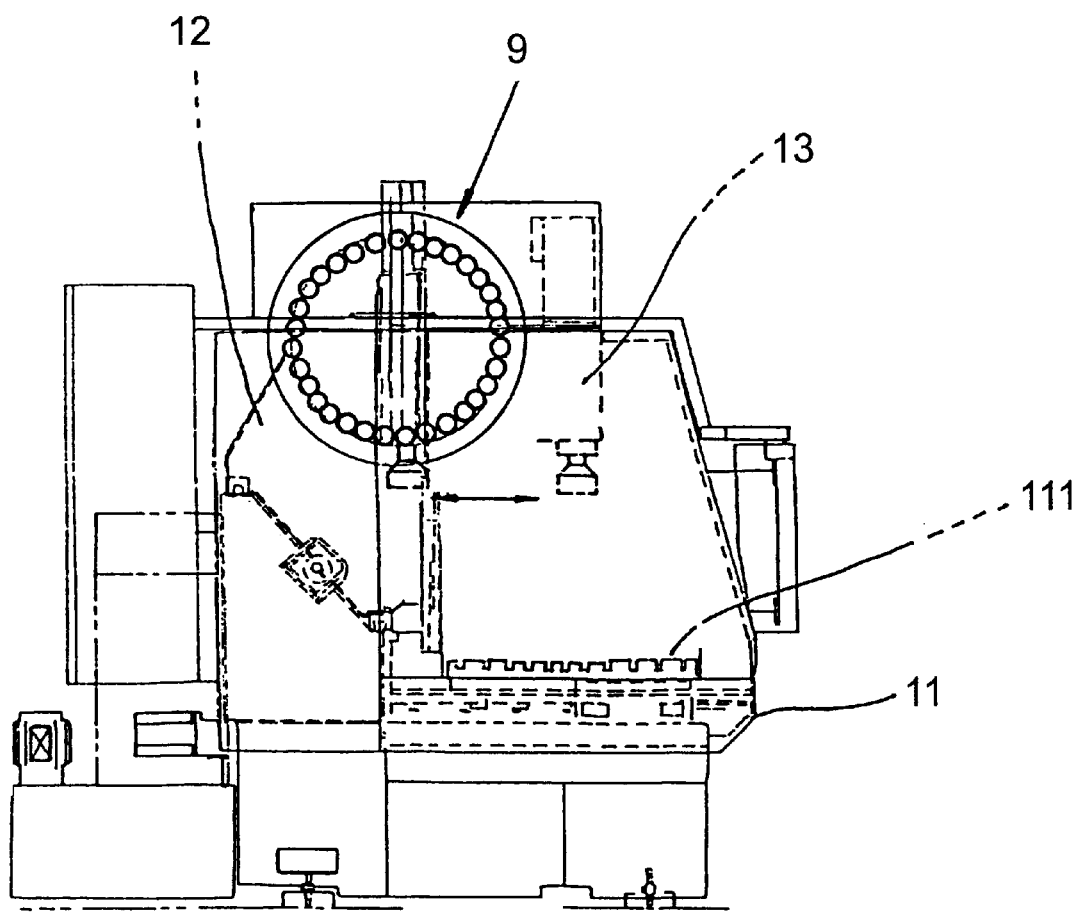
FIG. 7 is a view showing the position of a typical ATC in a machining center.
Figure 8A:
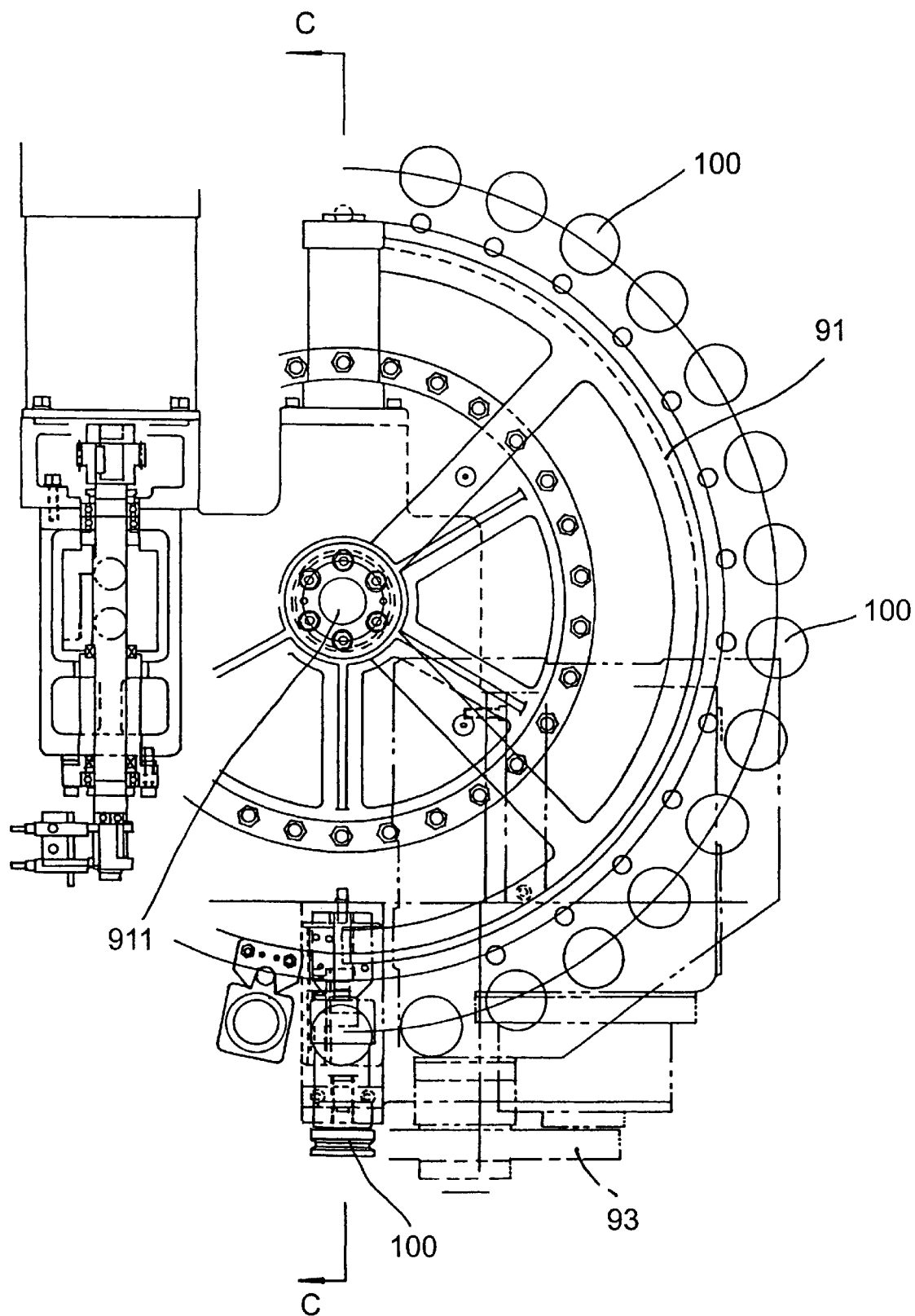
Figure 8B:
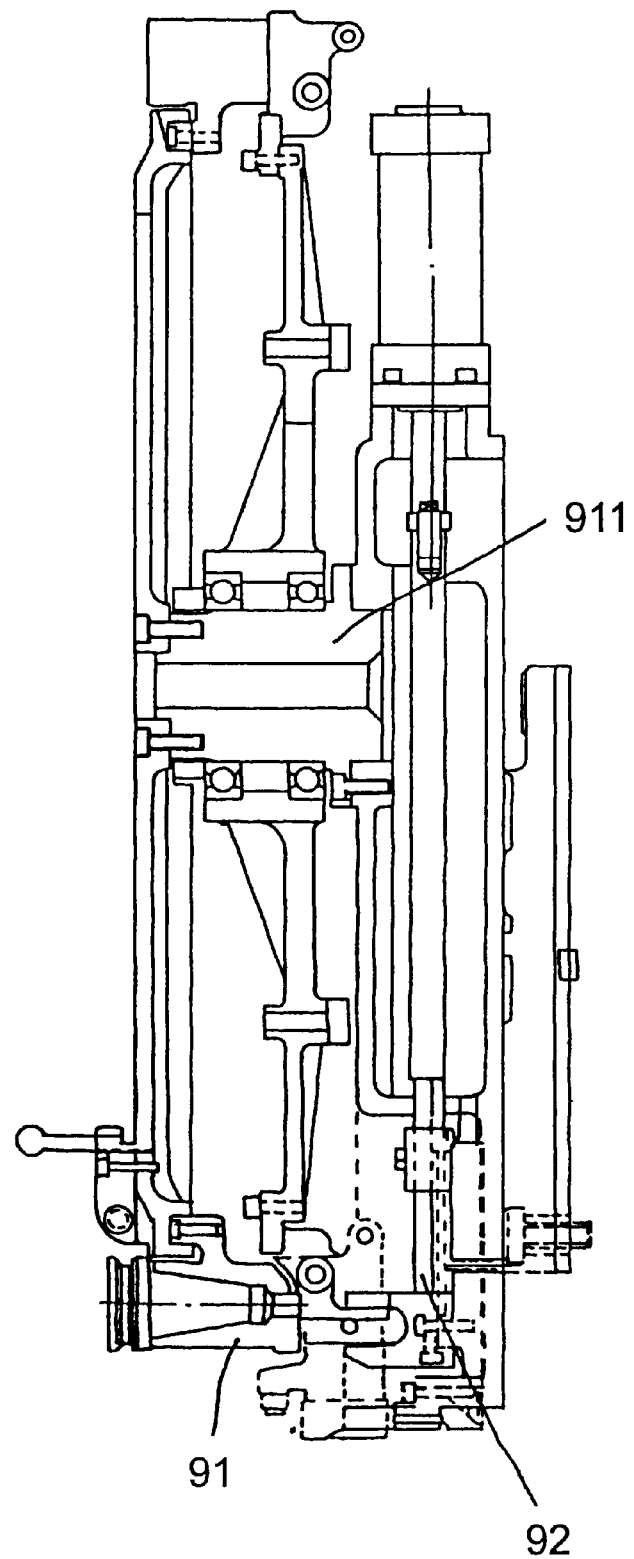

The construction of the tool changing means 5 is shown in FIGS. 2a, 2b and 6. As shown in the drawings, the tool changing means 5 is fixed to the bracket 33 of the arbor position changing means 3 at a position between the arbor rotation means 4 and the spindle stock 13. The tool changing means 5 comprises a drive unit 51, a rotary lift 52, a rotary arm 53 and an arbor support 54. The drive unit 51 is installed at a position inside the rotary housing 41 of the arbor rotation means 4. The rotary lift 52 is designed for selectively ascending or descending by the rotating force of the drive unit 51 prior to being rotated by the drive unit 51. The rotary arm 53 is provided at the lower end of the rotary lift 52 and is used for changing an existing arbor 100 of the spindle stock 13 with a vertically positioned new arbor 100. The arbor support 54 is provided on a side of the rotary lift 52 for supporting a vertically positioned arbor 100.

The above drive unit 51 comprises a drive motor 511 and an actuator 512. Both the drive motor 511 and the actuator 512 of the drive unit 51 are designed for selectively ascending or descending by a rack and pinion motion.

The rotary lift 52 comprises a rotary column 521 and a housing 522. The above rotary column 521 has a vertical rack and a pinion, which are not shown in the drawings and are driven by the drive motor 511 and the actuator 51, respectively. The housing 522 is fitted over the rotary column 521 and is fixed to the bracket 33 of the arbor position changing means 3.

The rotary arm 53 comprises a longitudinal connector 531 which is mounted to the lower end of the above rotary column 521 at its center. Two arms 532 are symmetrically formed on both ends of the connector 531 with a catching slot 532a being formed on each arm 532.

The ATC protection means 6 is positioned between the spindle stock 13 and the tool changing means 5 as shown in FIG. 2b. The above ATC protection means 6 thus protects the tool changing means 5 from the spindle stock 13. The ATC protection means 6 comprises a shielding wall 61 and a cover unit 62. The shielding wall 61 shields the tool changing means 5 from the spindle stock 13 and has an opening 611 at the center. Meanwhile, the cover unit 62 is provided around the opening 611 of the shielding wall 61 and selectively opens or closes in conjunction with a movement of the tool changing means 5.

The above cover unit 62 comprises a cover 621 and an actuator 622. The above cover 621 is positioned around the opening 611 of the shielding wall 61, thus normally closing said opening 611. Meanwhile, the actuator 622 is fixed to the shielding wall 61 at its cylinder, with the piston rod of the actuator 622 being coupled to the cover 621.

The operational effect of the above ATC for machining centers will be described hereinbelow.

The ATC selects a desired tool as follows. As shown in FIGS. 2a, 2b and 5, when an existing tool of the spindle stock 13 accomplishes its operation, the drive motor 421 of the arbor rotation means 4 is started under the control of a controller (not shown) of the machining center. The rotation force of the drive motor 421 is transmitted to the drive gear 422 through its output shaft, thus rotating the drive gear 422. The drive gear 412 of the rotary housing 41, engaging with the drive gears 422, is thus rotated. This causes the rotary housing 41 to be rotated along with the arbor holder units 411, thus allowing a selected tool to be positioned at the top position of the rotary housing 41. In such a case, the selected tool is kept horizontally by the arbor holder unit 411.

The selected tool is, thereafter, shifted from its horizontal position to its vertical position by the arbor position changing means 3 as follows.

As shown in FIGS. 2a, 2b and 4, the piston rod 312 of the actuator 311 of the arbor position changing means 3 extends, thus allowing the lift 32, coupled to the end of the piston rod 312, to descend.

At the same time, the link 411d of the arbor holder unit 411 moves inwardly while being fitted into the groove 321 of the lift 32. The link 411d is thus rotated at an angle of 90° in an inverse direction around its hinged joint where the link 411d is jointed to the bracket 411a. Thereafter, the selected arbor 100, which is vertically positioned, is brought into close contact with the arbor support 54 of the tool changing means 5, thus being positioned to be horizontally aligned with the tool changing position of the spindle stock 13.

The existing tool of the spindle stock 13 is, thereafter, changed with the selected tool as follows.

As shown in FIGS. 2a, 2b, 6a and 6b, the position of the two arms 532 of the rotary arm 53 of the tool changing means 5 are primarily reversed. In such a case, the cover 621 of the ATC protection means 6 keeps closed the opening 611 of the shielding wall 61. Thereafter, the existing tool of the spindle stock 13 is changed with the selected tool. That is, the actuator 622 of the cover unit 62 is started to open the cover 611 of the opening 611.

The actuator 512 of the tool changing means 5 is, thereafter, started, thus rotating the rotary column 521 at an angle of 90°, and rotating the rotary arm 53 at the same angle and in the same direction. Therefore, the rotary arm 53 is shifted from a position, shown by the solid line of FIG. 6b, into another position shown by the phantom line. The existing arbor 100 of the spindle stock 13 and the selected arbor 100 are caught by the slots 532a of both arms 532, respectively.

The drive motor 511 is, thereafter, started to allow the rotary column 521 to descend to a predetermined position where the two arbors 100 caught by both arms 532 are removed from both the spindle stock 13 and the arbor holder unit 411, respectively.

The rotary arm 53 is rotated at an angle of 90° by the actuator 512 prior to starting the drive motor 511. When the drive motor 511 is started as described above, the rotary column 521 ascends and this causes the selected arbor 100 to be installed on the spindle stock 13 with the removed arbor 100 being held by the arbor holder unit 411.

The arbor holder unit 411, with the removed arbor 100, returns to its horizontal position by an inverse operation of the arbor position changing means 3. Thereafter, the cover 621 closes the opening 611 of the shielding wall 61, thus accomplishing one cycle of the ATC operation. During an operation of a machining center, the above-mentioned process is repeated to change tools.

As described above, the present invention provides an ATC for machining centers. The ATC is positioned at a side of the movable table of a machining center and effectively changes tools within the inner diameter circle of a rotary housing, thus shortening the arbor movement stroke and conserving the tool changing time during a tool changing operation.

The ATC of this invention is also effectively protected from the machining part or the spindle stock of a machining center, thus being almost completely free from any damage caused by chips from the machining part.

The above ATC is positioned at a side of the movable table in place of the column different from a typical ATC, so that it remarkably reduces the volume of the ATC protection cover and saves the manufacturing cost of such machining centers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic tool changing device for machining tools, the machining tools individually comprising a bed movably carrying a table to allow said table to be movable along an X-axis of the bed, a column positioned at a side of said bed to be movable along a Y-axis of the bed, and a spindle stock positioned in front of said column to be movable along a Z-axis of the bed with a tool carrying arbor being held to said spindle stock, comprising:

arbor rotation guide means provided on said bed at a position around the table and having an annular guide groove formed on an inner wall of a cylindrical housing;

arbor position changing means positioned above said arbor rotation guide means and adapted for selectively changing a position of a selected one of said arbors from its horizontal position to its vertical position;

arbor rotation means installed inside said arbor rotation guide means and adapted for rotating said arbors, said arbor rotation means including a plurality of arbor holder units regularly positioned on an inner diameter wall of a rotary housing and individually holding a tool carrying arbor, the annular groove of said arbor rotation guide means guiding a rotating action of the plurality of arbor holder units; and tool changing means positioned between said arbor rotation means and said spindle stock and adapted for changing an existing arbor of said spindle stock with said selected arbor.

2. An automatic tool changing device for machining tools, the machining tools individually comprising a bed movably carrying a table to allow said table to be movable along an X-axis of the bed, a column positioned at a side of said bed to be movable along a Y-axis of the bed, and a spindle stock positioned in front of said column to be movable along a Z-axis of the bed with a tool carrying arbor being held to said spindle stock, comprising:

arbor rotation guide means provided on said bed at a position around the table and adapted for guiding a rotating action of a plurality of tool carrying arbors, said arbor rotation guide means including a cylindrical housing and a first bracket adapted for connecting a bottom of said cylindrical housing to said bed, said cylindrical housing having:

an annular guide groove formed on an inner diameter wall of the cylindrical housing at a lower portion, thus guiding a rotating action of a plurality of arbor holders of said arbor rotation means; and an opening formed on said cylindrical housing at a top portion opposite to said annular guide groove, said opening allowing a roller of an arbor holder associated with the selected arbor to be rotatable to the front prior to being removed from the arbor holder when the selected arbor is shifted from its horizontal position to its vertical position;

arbor position changing means positioned above said arbor rotation guide means and adapted for selectively changing a position of a selected one of said arbors from its horizontal position to its vertical position;

arbor rotation means installed inside said arbor rotation guide means and adapted for rotating said arbors; and tool changing means positioned between said arbor rotation means and said spindle stock and adapted for changing an existing arbor of said spindle stock with said selected arbor.

3. An automatic tool changing device for machining tools, the machining tools individually comprising a bed movably candying a table to allow said table to be movable along an X-axis of the bed, a column positioned at a side of said bed to be movable along a Y-axis of the bed, and a spindle stock positioned in front of said column to be movable along a Z-axis of the bed with a tool carrying arbor being held to said spindle stock, comprising:

arbor rotation guide means provided on said bed at a position around the table and adapted for guiding a rotating action of a plurality of tool carrying arbors;

arbor position changing means positioned above said arbor rotation guide means and adapted for selectively changing a position of a selected one of said arbors from its horizontal position to its vertical position, said arbor position changing means including a drive unit having an actuator at the center of said arbor position changing means;

a lift selectively ascending or descending by said drive unit, said lift having a groove connected to a plurality of arbor holder units of said arbor rotation means, thus selectively shifting the position of the selected arbor between its horizontal and vertical positions; and a second bracket positioned at a side of said drive unit and adapted for holding a position of said tool changing means;

arbor rotation means installed inside said arbor rotation guide means and adapted for rotating said arbors; and tool changing means positioned between said arbor rotation means and said spindle stock and adapted for changing an existing arbor of said spindle stock with said selected arbor.

4. An automatic tool changing device for machining tools, the machining tools individually comprising a bed movably carrying a table to allow said table to be movable along an X-axis of the bed, a column positioned at a side of said bed to be movable along a Y-axis of the bed, and a spindle stock positioned in front of said column to be movable along a Z-axis of the bed with a tool carrying arbor being held to said spindle stock, comprising:

arbor rotation guide means provided on said bed at a position around the table and adapted for guiding a rotating action of a plurality of tool carrying arbors;

arbor position changing means positioned above said arbor rotation guide means and adapted for selectively changing a position of a selected one of said arbors from its horizontal position to its vertical position;

arbor rotation means installed inside said arbor rotation guide means and adapted for rotating said arbors said arbor, rotation means including a rotary housing having:

a plurality of arbor holder units regularly positioned on an inner diameter wall of said rotary housing and individually holding a tool carrying arbor;

a driven gear formed on said rotary housing; and a guide groove formed on said rotary housing at a position around said driven gear;

a drive unit having:

a drive motor positioned at a side of said driven gear of the rotary housing; and a drive gear engaging with both an output shaft of said drive motor and said driven gear of the rotary housing, thus selectively rotating the rotary housing by a rotating force of the drive motor; and a plurality of guide rollers installed on said rotary housing at regular intervals and engaging with said guide groove of the rotary housing, thus guiding a rotating action of said rotary housing in cooperation with said guide groove while preventing the rotary housing from any eccentricity; and tool changing means positioned between said arbor rotation means and said spindle stock and adapted for changing an existing arbor of said spindle stock with said selected arbor.

5. The automatic tool changing device according to claim 4, wherein each of said arbor holder units comprises:

a third bracket fixed to said rotary housing;

an arbor holder hinged to a front portion of said third bracket and adapted for holding a tool carrying arbor, said arbor holder having a roller at a top portion, said roller rotatably engaging with an annular guide groove formed on a cylindrical housing of said arbor rotation guide means; and a link provided with a roller, said link being provided at a top portion of said arbor holder and having connected to a lift of said arbor position changing means, thus selectively changing a position of a selected arbor holder unit between its horizontal and vertical positions.

6. The automatic tool changing device according to claim 1, further comprising:

protection means for shielding the tool changing means from the spindle stock, said protection means comprising:

a shielding wall positioned between said spindle stock and said tool changing means, thus shielding the tool changing means from the spindle stock, said shielding wall having an opening at the center; and a cover unit provided around said opening of the shielding wall and adapted for being selectively opened or closed in conjunction with a movement of the tool changing means.

7. The automatic tool changing device according to claim 6, wherein said cover unit comprises:

a cover provided around said opening of the shielding wall, thus normally closing said opening; and an actuator fixed to said shielding wall at its cylinder part and coupled to said cover at its piston rod part, thus selectively opening the cover.

8. The automatic tool changing device according to claim 2, further comprising:

protection means for shielding the tool changing means from the spindle stock, said protection means comprising:

a shielding wall positioned between said spindle stock and said tool changing means, thus shielding the tool changing means from the spindle stock, said shielding wall having an opening at the center; and a cover unit provided around said opening of the shielding wall and adapted for being selectively opened or closed in conjunction with a movement of the tool changing means.

9. The automatic tool changing device according to claim 8, wherein said cover unit comprises:

a cover provided around said opening of the shielding wall, said cover normally closing said opening; and an actuator fixed to said shielding wall at its cylinder part and coupled to said cover at its piston rod part, thus selectively opening the cover.

10. The automatic tool changing device according to claim 3, further comprising:

protection means for shielding the tool changing means from the spindle stock, said protection means comprising:

a shielding wall positioned between said spindle stock and said tool changing means, thus shielding the tool changing means from the spindle stock, said shielding wall having an opening at the center; and a cover unit provided around said opening of the shielding wall and adapted for being selectively opened or closed in conjunction with a movement of the tool changing means.

11. The automatic tool changing device according to claim 10, wherein said cover unit comprises:

a cover provided around said opening of the shielding wall, said cover normally closing said opening; and an actuator fixed to said shielding wall at its cylinder part and coupled to said cover at its piston rod part, thus selectively opening the cover.

12. The automatic tool changing device according to claim 4, further comprising:

protection means for shielding the tool changing means from the spindle stock, said protection means comprising:

a shielding wall positioned between said spindle stock and said tool changing means, thus shielding the tool changing means from the spindle stock, said shielding wall having an opening at the center; and a cover unit provided around said opening of the shielding wall and adapted for being selectively opened or closed in conjunction with a movement of the tool changing means.

13. The automatic tool changing device according to claim 12, wherein said cover unit comprises:

a cover provided around said opening of the shielding wall, said cover normally closing said opening; and an actuator fixed to said shielding wall at its cylinder part and coupled to said cover at its piston rod part, thus selectively opening the cover.

* * * * *